United States Patent
Tuey et al.

(10) Patent No.: US 9,529,161 B2
(45) Date of Patent: Dec. 27, 2016

(54) PLUG AND SOCKET DEVICE

(71) Applicant: Tyco Electronics AMP GmbH, Bensheim (DE)

(72) Inventors: Ufuk Tuey, Mannheim (DE); Peter Kraemer, Grasellenbach (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 14/495,865

(22) Filed: Sep. 24, 2014

(65) Prior Publication Data
US 2015/0086171 A1  Mar. 26, 2015

(30) Foreign Application Priority Data
Sep. 26, 2013 (DE) .................. 10 2013 219 459

(51) Int. Cl.
*H01R 13/62* (2006.01)
*G02B 6/38* (2006.01)
*H01R 13/627* (2006.01)
*H01R 13/506* (2006.01)
*H01R 13/639* (2006.01)
*H01R 13/516* (2006.01)

(52) U.S. Cl.
CPC ......... *G02B 6/3893* (2013.01); *H01R 13/506* (2013.01); *H01R 13/6273* (2013.01); *H01R 13/639* (2013.01); *H01R 13/516* (2013.01)

(58) Field of Classification Search
CPC . H01R 13/506; H01R 13/6273; H01R 13/639; H01R 13/516
USPC ................................ 439/352, 342
See application file for complete search history.

(56) References Cited

U.S. PATENT DOCUMENTS 5,226,835 A    7/1993  Baker et al.
6,056,574 A *  5/2000  Yeomans ........... H01R 13/6273
                                                   439/327
(Continued)

FOREIGN PATENT DOCUMENTS

DE    69113778    5/1996
DE    69027345    1/1997
(Continued)

OTHER PUBLICATIONS

European Search Report issued by the European Patent Office, Munich, Germany, dated Feb. 24, 2015, for European Application No. 14186521.2; 8 pages.

*Primary Examiner* — Felix O Figueroa
(74) *Attorney, Agent, or Firm* — Faerge Baker Daniels LLP (57) ABSTRACT

A plug and socket device includes at least one housing and one base plate for accommodating the at least one housing. The housing has a base body and at least two locking means. The locking means each have an elongated locking arm and a locking hook. The base plate has at least one locking nose corresponding to the locking means. The locking nose is formed such that in the fully plugged-in position of the housing and the ground plate the locking hook engages behind the locking nose such that a positive locking is established between the locking means and the locking nose, and unintentional detachment of the plug and socket device is difficult. The base plate has at least one securing element that prevents the detachment of the locking hook and thus serves to secure the position of the locking means in the fully plugged-in position.

11 Claims, 5 Drawing Sheets

(56) References Cited

U.S. PATENT DOCUMENTS

| | | | | |
|---|---|---|---|---|
| 6,592,404 B2 * | 7/2003 | Endo | ................... | H01R 13/641 439/357 |
| 7,118,403 B1 * | 10/2006 | Drye | ................. | H01R 13/6272 439/352 |
| 2005/0202706 A1 | 9/2005 | Bonavia et al. | | |
| 2006/0110957 A1 | 5/2006 | Lekic et al. | | |

FOREIGN PATENT DOCUMENTS

| | | |
|---|---|---|
| DE | 19714459 A1 | 10/1998 |
| DE | 60206854 | 7/2006 |
| EP | 0382344 | 8/1990 |
| EP | 0510229 | 10/1992 |
| EP | 1282200 | 5/2003 |
| EP | 1662620 A2 | 5/2006 |
| FR | 2669897 | 6/1992 |
| GB | 2311420 | 9/1997 |

* cited by examiner

PLUG AND SOCKET DEVICE

BACKGROUND

The present application claims priority from German patent application DE 10 2013 219 459.5 filed on Sep. 26, 2013; the subject matter of which is incorporated herein by reference.

The present invention relates to a plug and socket device.

Plug and socket devices with a housing and a suitable base plate for receiving the housing are known from the prior art in diverse designs and are used among other things, in order to establish mechanical, electrical and/or optical connections. In order to ensure that the plug and socket devices remain connected with each other, plug and socket devices are often used, which have difficult to detach and complex means for locking on the housing and the complementary base plate. For reasons of safety or warranty, for example, in automobile manufacture in the case of electronic immobilizer systems, it is desirable to design the plug and socket devices such that the connection once plugged-in and locked in place is maintained as long as possible.

It is known from the prior art, that plug and socket devices have locking means, which as a rule comprise a locking arm and a locking hook on a first component and a locking nose corresponding to the locking hook on a second component. Furthermore, plug and socket devices are known, which due to the application area have comparatively small or short locking arms and locking hooks. This proves to be disadvantageous, since during the plug-in process the short locking arms and locking hooks are subject to a comparatively large displacement, whereby material damages often occur in the form of permanent deformations or cracks.

SUMMARY

In order to prevent such material damages or deformations, the material composition of the locking arms or locking hooks is selected which is elastic such that the comparatively large displacement during the plugging together cannot cause the material damages mentioned to the short locking arms and locking hooks. In this connection, it proves to be disadvantageous that due to the elastic material composition of the locking arms and locking hooks the plug and socket device can be detached with very little force effect, so that no secure and above all permanent connection of the plug and socket device can be ensured.

The problem addressed by the present invention consists of providing a plug and socket device, in which no material damages or deformations occur to the locking arms or to the locking hooks during the plugging together, which, however, once locked in place, can no longer be detached without destructive effect, so that a permanent and detachment-proof plug connection is ensured. In this connection, the plug and socket device should be as simple and cost-effective as possible in its manufacture and installation.

This problem is solved by means of a plug and socket device with the features of claim 1. Preferred further developments are indicated in the dependent claims.

A plug and socket device comprises at least one housing and one base plate for receiving the at least one housing, wherein the housing has a base body and at least two locking means located thereon. The locking means each have an elongated locking arm and a locking hook. The base plate comprises a locking nose corresponding to the locking means, wherein the locking nose is formed such that in a fully plugged-in position of the housing and the base plate the locking hooks engage behind the locking nose in such a manner that a positive locking is established between the locking means and the locking nose, so that an unintentional detachment of the plug and socket device is made difficult. Furthermore, the base plate has at least one securing element, wherein the securing element is designed in such a manner that the securing element prevents the detachment of the locking hook and thus serves to secure the position of the locking means in the fully plugged-in position.

The housing thus comprises at least two locking means, which in the fully plugged-together state are engaged with at least one locking nose and one securing element of the base plate, whereby it is ensured that the housing is fixed to the base plate in such a manner that an unintentional, thoughtless, or unauthorized detachment of the plug and socket device is prevented as far as possible, once the plug and socket device is fully plugged together.

In one embodiment of the plug and socket device the securing element is designed in such a manner that during the plugging together of the housing and the base plate starting from a starting position it causes an elastic deformation of the locking means in a first plane, so that the housing is plugged into the base plate against a resistance caused by this elastic deformation.

Advantageously, the securing element is thereby formed in such a manner that during the plugging together of the housing and the base plate the locking means slide along the securing element in such a manner that the securing element offers this movement essentially no resistance.

Furthermore, the locking nose and the locking means can be formed in such a manner that the locking means in the fully plugged-in position essentially springs back again into the starting position and then have no deformation in the first plane.

Advantageously, the securing element is formed such that in the fully plugged-in position it prevents an elastic deformation of the locking means in the first plane, whereby an unintentional detachment of the plug and socket device can be prevented as far as possible.

The securing element can thereby be designed in such a manner that during the plugging together of the housing and the base plate it causes an elastic deformation of the locking means in a second plane, which is perpendicular to the first plane. The locking means in the fully plugged-in position thereby has essentially no deformation in the second plane.

In an advantageous design the securing element extends starting from the base plate in the shape of a pyramid in the direction of the housing in such a manner that during the plugging together of the housing and the base plate the locking means glide along on a side surface of the pyramidal securing element and are elastically deformed in the direction of the second plane.

A rear engagement (a) of the locking hooks behind the locking nose is thereby greater than a lateral distance (d) between the securing element and the locking hook, so that the securing element in the fully plugged-in position serves to secure the position of the locking means and thus additionally makes the detachment of the plug and socket device difficult.

It is also provided that the locking means have a material composition, which is selected such that in the case of effects of a sufficiently high tractive force the plug connection is detached by a plastic deformation of the locking means. A detachment of the locking means from the locking nose can thus indeed occur, however, only deliberately and with the application of such a high tractive force that the locking means are permanently damaged.

At the same time, it can also be provided that the base plate, the securing element, and the locking nose have a material composition, which is selected in such a manner that the base plate, the securing element, and the locking nose remain essentially intact when the plug and socket device is detached. In this way, it can be ensured that the base plate, the locking nose, and/or the security element are undamaged after the housing has been separated from the base plate and thus the base plate can be used again. Thus, an active application of a high tractive force is necessary to detach the plug and socket device, so that it can be ensured that an unintentional separation of the housing from the base plate is effectively prevented.

In an especially preferred embodiment the securing element is arranged in the fully plugged-in position between two locking hooks of a housing and in each case a locking hook engages behind a locking nose, wherein the locking hooks extend away from the securing element and from each other in the direction in each case of one of the two locking noses.

Especially preferably the housing has four locking means, which correspond to four locking noses of the base plate, wherein in the fully plugged-in position at least one securing element is arranged between two of the four locking means, wherein in each case one locking hook engages behind one locking nose. Thus, the two locking means are located between two locking noses, so that the locking hooks extend outwards in the direction of the locking noses and engage behind the latter. The securing element is located in the center between the locking hooks and can thus serve to secure the position of the locking means. Thus, to a particular extent the stability of the plugged-in housing can be ensured and an unintentional detachment of the plug and socket device can be prevented, wherein as a rule several housings each with four locking hooks are arranged next to each other on the base plate.

Alternatively, however, the locking nose can also be arranged in the fully plugged-in position between two locking means of the housing, wherein in this case the two locking means are located between two securing elements and the locking hooks of the locking means extend inwards to the locking nose. The one locking nose is engaged behind by two locking hooks of a housing, so that in this case two securing elements must serve to secure the position of the locking means or locking hooks.

In principle, the locking hooks extend pointing away from the securing elements in the direction of the locking nose, so that a secure positive locking can be established between the locking hook and the locking nose and the securing element permanently ensures this positive locking between the locking nose and locking hook by securing the position of the locking hooks. The plug and socket device is thus suitable for establishing a permanent mechanical, electrical, and/or optical connection which can only be detached with difficulty.

Additional features, application options, and advantages of the invention result from the following description of the embodiment of the invention, which is depicted in the drawing. At the same time it should be noted that the features described or depicted in the figures in themselves or in any combination for the subject matter of the invention, regardless of their summary in the patent claims or their reference as well as regardless of their wording or depiction in the description or in the drawing, have only a descriptive character and are not intended to limit the invention in any form.

BRIEF DESCRIPTION OF THE DRAWINGS

The invention is explained in detail below by means of the figures.

DETAILED DESCRIPTION

Figure 1:
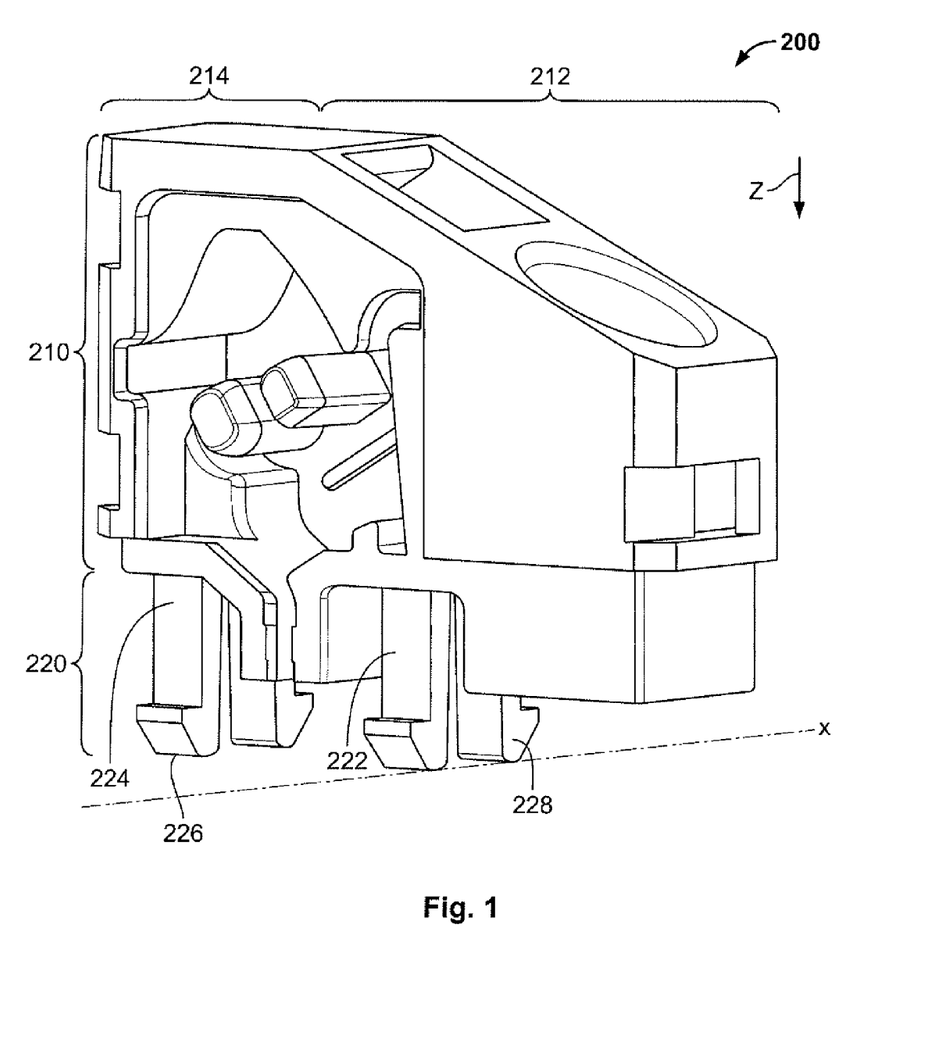
FIG. 1 shows a schematic perspective depiction of a housing of a plug and socket device.
Figure 2:
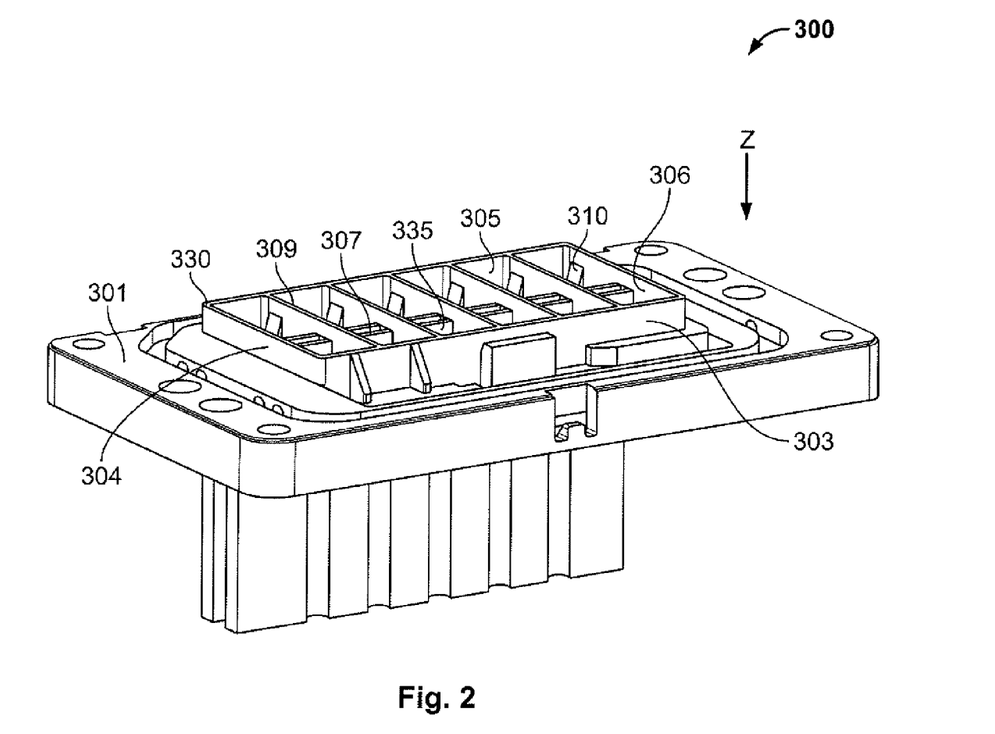
FIG. 2 shows a schematic perspective depiction of a base plate of a plug and socket device.
Figure 3:
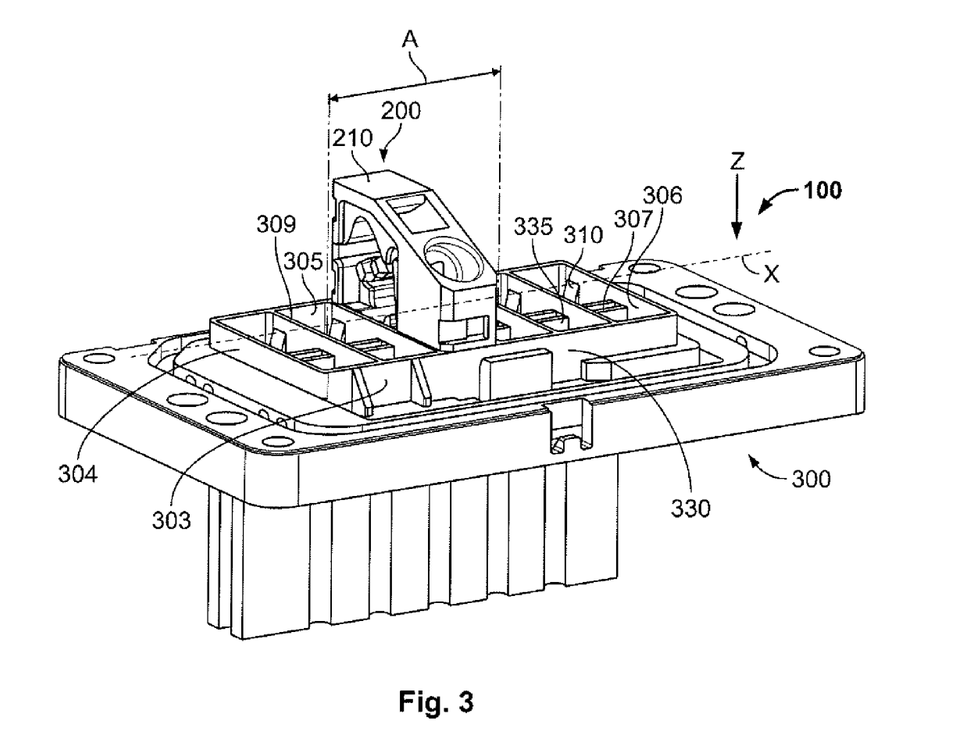
FIG. 3 shows a schematic perspective depiction of a plug and socket device with the housing from FIG. 1 and the base plate from FIG. 2.

FIGS. 1 to 3 illustrate in a schematic perspective depiction in each case one of the two main components of a plug and socket device 100. Thus, in FIG. 1 a housing 200 of a plug and socket device 100 is depicted having a base body 210 and four locking means 220, wherein the locking means in each case have an elongated locking arm 222 and a locking hook 228, The locking means 220 are fastened to a first end 224 of the locking arm 222 on the base body 210 of the housing 200 and extend starting from the base body 210 downwards. in each case a locking hook 228 is located on a second end 226 of the locking arm 222 turned away from the base body 210. In each case two locking means 220 are arranged along an axis x parallel to each other, wherein in each case two locking means 200 having a front area 212 and two locking means 220 are connected to a back area 214 of the base body 210.

In FIG. 2 a base plate 300 of the plug and socket device 100 is depicted, which is designed in the embodiment depicted in such a manner that in a plugged-together state it can accommodate six of the housings 200, which are depicted in FIG. 1. The base plate 300 has a surface 301, wherein the surface 301 forms a plug opening 330 with a front wall 303, a first side wall 304, a back wall 305 and a second side wall 306. Inside the plug opening 330 several recesses 335 are formed by five intermediate walls 309 and a dividing wall 307, wherein each recess 335 corresponds in itself to a locking means 220 of a housing 200. Accordingly, the depicted base plate 300 can accommodate three of the housings 200 depicted in FIG. 1 each with locking means 220 in such a manner that, the locking means 200 of the housing can be introduced into recesses 335 of the plug opening 330.

FIG. 3 shows by way of example the accommodation of a housing 200 from FIG. 1 in a base plate 300 from FIG. 2, wherein the locking arms 222 and the locking hooks 228 of the locking means 220 of the housing 200 are fully accommodated in the recesses 330 of the base plate 300. At the same time, it can be clearly seen that two additional housings 200 can still be introduced into the plug opening 330 of the base plate 300.

Figure 4:
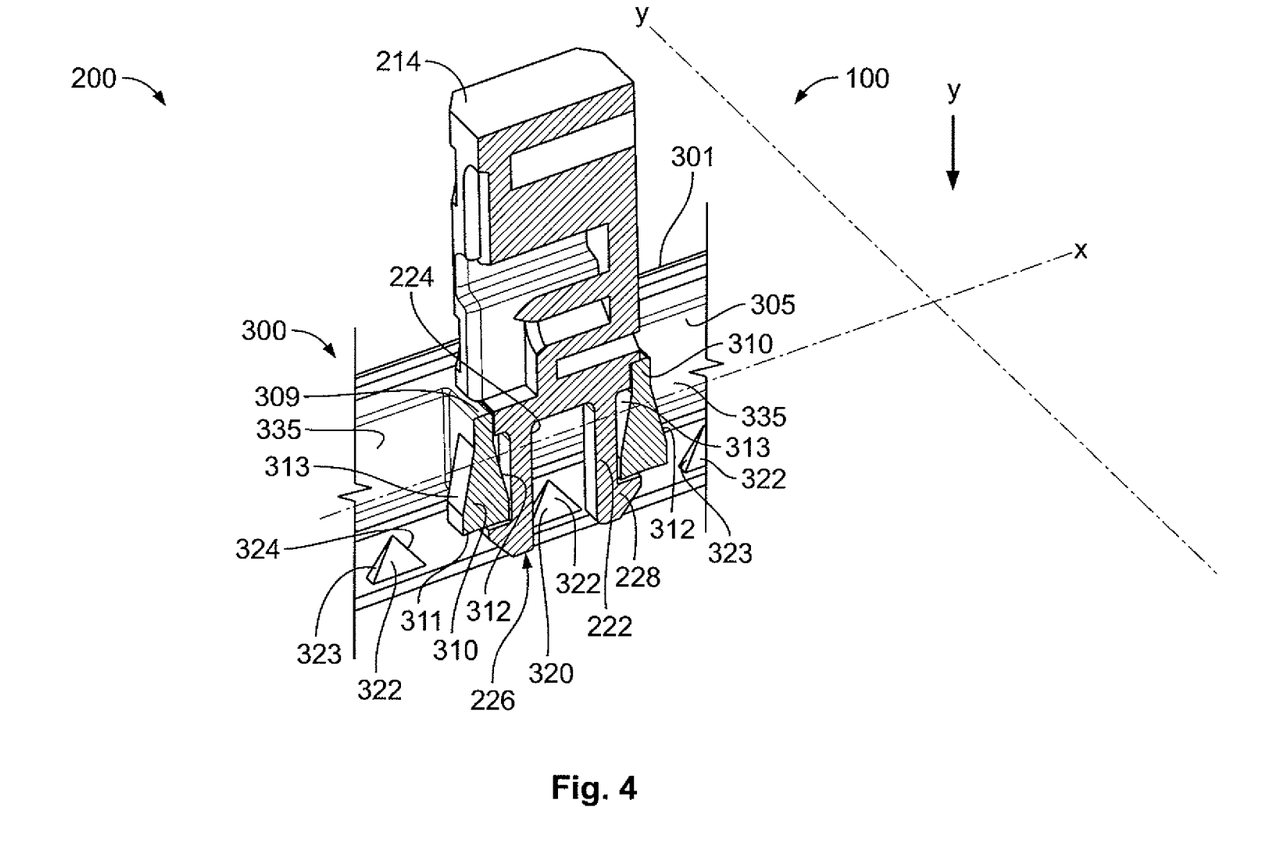
FIG. 4 shows a perspective cross-sectional depiction of a first embodiment of a plug and socket device.

The embodiment described in FIG. 4 is a perspective schematic cross-sectional depiction along a cutting plane A depicted in FIG. 3. The plug and socket device 100 is thus depicted cut in such a manner that from the housing 200 only the back area 214 of the base body 210 and two locking means 220 each with a locking arm 222 and the one locking hook 228 can be seen, The locking means 220 are arranged with the first end 224 of the locking arm 224 on the base body 210 of the housing 200 and have the locking hooks 228 on the second end 226.

The base plate 300 has intermediate walls 309, wherein the intermediate walls 309 extend starting from the back wall 305 in the direction of the dividing wall 307, which is not depicted. Each intermediate wall 309 forms a locking nose 310, wherein the locking noses 310 are formed from the intermediate walls 309 and widen more and more in the plane X starting from the surface 301 of the base plate 300 in the plug direction Z in the direction of the recesses 335, so that in the present embodiment they form a pear-shaped structure or an isosceles triangle. Thus, the locking nose 310 has a base side and two legs, wherein the base side corresponds to a locking surface 311 and the two legs correspond to a first ramp surface 312 and a second ramp surface 313 opposite the first ramp surface 312. The two ramp surfaces 312, 313 of the locking nose 310 thus diverge more and more from each other top down in the direction of the base plate 300. The locking surface 311 is arranged horizontally to the plug direction Z and is engaged behind by locking hook 228 of the locking means 220.

The locking noses 310 are arranged laterally from the locking hooks 228 of the housing 200 in such a manner that, the locking noses 310 correspond to and engage with the locking hooks 228. Furthermore, the base plate 300 has securing elements 320, Which are each arranged in the center between the locking noses 310. In the plugged-in position depicted the securing element 320 is located in the center between the locking means 220 of the housing 200 and the locking noses 310 of the base plate 300 in such a manner that the securing element 320 serves to secure the position of the locking means 220.

During the plug-in process the locking means 220 of the housing 200 are introduced into the recesses 335 of the surface 301 of the base plate 300, wherein the locking hooks 228 are designed such that in each case a locking hook 228 of a locking means 220 slides along on each of the two ramp surfaces 312, 313. Due to the geometry of the locking noses 310 the locking arms 228 are deformed elastically from a starting position in a first plane x such that the two locking hooks 228 move towards each other until the housing 200 is completely connected to the base plate 300. At the same time, a material composition of the locking means 220 is selected which is elastic, such that during the plug-in process no material damage can occur to the locking means 220, for example, in the form of cracks.

The securing element 320 is designed in the embodiment depicted as a half pyramid or approximately in the shape of a pyramid, wherein it extends in the direction of the surface 301 of the base plate and thus counter to the plug direction Z. The pyramidal design has a first ramp surface 322 directed forwards, a second lateral ramp surface 323 and a third ramp surface 324 and is located in the center between the two locking hooks 228 of the plugged-in housing 200.

During the continuing plug-in process of the housing 200 and the base plate 300 the locking means 220 with the locking hooks 228 encounter the first ramp surface 322 of the securing element 320 and slide along on the latter, so that the locking means 220 experience an additional elastic deformation in a second plane y, which is perpendicular to the first plane X.

The two locking hooks 228 of the locking means 220 are thus on the one hand moved toward each other by the locking nose 310 and on the other hand are moved forward and/or away from each other by the securing element 320. At the same time, the securing element 320 is formed by the pyramidal or triangular design such that during the plug-in process of the housing 200 and the base plate 300 the locking means 220 slide along on the securing element 320 and the locking nose 310 such that the latter offer essentially no resistance to the plug-in process.

After the locking hooks 228 have passed through locking noses 310, the elastically deformed locking means 220 move from the pressed-together position back into the starting position, thereby in each case a locking hook 228 of the locking means 220 encompasses the locking surface 311 and in each case one of the two ramp surfaces 312, 313 of a locking nose 310. Thus, the locking means 220 in the fully plugged-in position essentially spring back again into their starting position and in the plugged-in position have neither a deformation in the first plane x nor in the second plane y.

Figure 6:
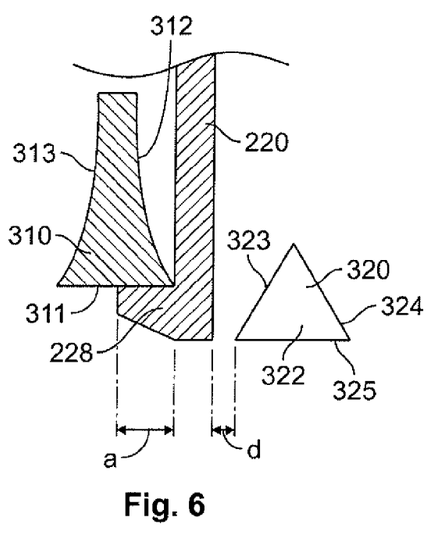
FIG. 6 shows a schematic detailed view of a section from FIG. 4.

In this fully plugged-in position a rear engagement a of the locking hooks 228 behind the locking surface 311 of the locking nose 310 is greater than a lateral distance d between the securing element 320 and the locking hook 310, so that the securing element 320 in the fully plugged-in position serves to secure the position of the locking hook 228 (FIG. 6). The securing element 320 thus blocks the locking hook 228, whereby a detachment of the plug and socket device 100 is made additionally difficult.

However, if the detachment of the plug and socket device 100 is desired, this can nevertheless occur due to the elastic material of the locking means 220 with the application of a very high tractive force against the plug direction Z, wherein in this case the locking means 220 would preferably be subjected to a permanent plastic deformation and thus would be destroyed. A subsequent reuse of the housing 200 in this case cannot occur. On the contrary, a material composition can be selected for the locking nose 310, the securing element 320, and the base plate 300, such that the base plate 300, the securing element 320, and the locking nose 310 remain essentially intact when the plug and socket device 100 is detached.

Figure 5:
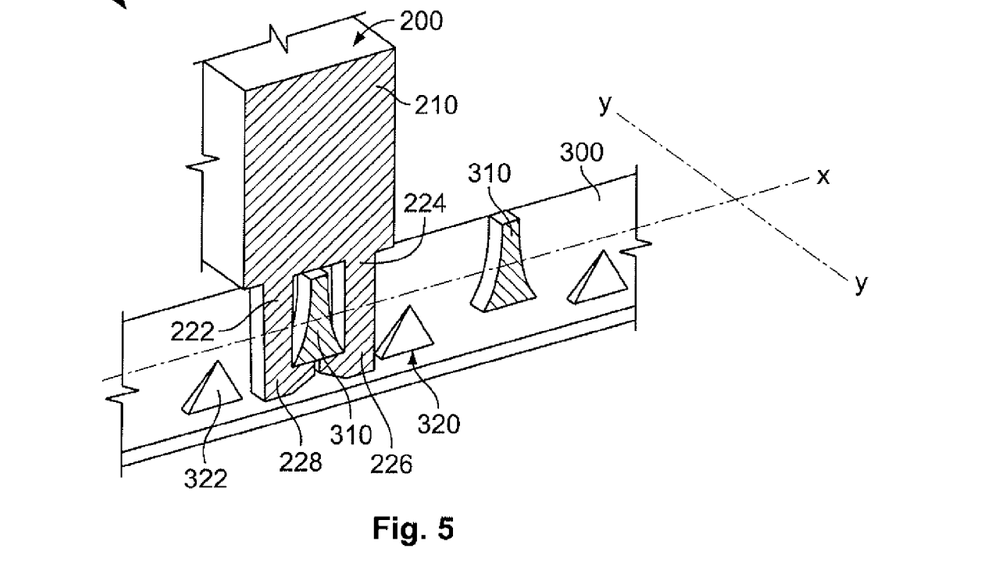
FIG. 5 shows a perspective cross-sectional depiction of a second embodiment of a plug and socket device.

In principle, the embodiment described in FIG. 5 is also a perspective schematic cross-sectional depiction. Thus, the housing 200 has four locking means 220, which correspond to two locking noses 310 of the base plate 300, so that in the depicted plugged-in position a locking nose 310 is arranged in each case between two of the four locking means 22,0 and in each case two locking hooks 228 engage behind a locking nose 310. In this case, four securing elements 320 also ensure that the position of the locking hook 228 is secured, wherein in each case two locking hooks 228 are arranged between two securing elements 320. The base plate 300 is thereby designed such that it can accommodate several housings 200.

The plug and socket device 100 is depicted cut in FIG. 4 and FIG. 5 such that merely the back area 214 of the housing 200 can be seen. The embodiment depicted in FIG. 5 differs from that shown in FIG. 4 in that a locking nose 310 is arranged between the locking arms 222 and the two locking hooks 228 lie between two securing elements 320. At the same time, the locking hooks 228 of the locking means 220 point towards each other in the direction of the locking nose 310 and engage behind the first locking surface 311 and the ramp surfaces 312, 313 of the locking nose 310 such that a positive connection is established. In this case two securing elements 320, which are arranged in each case laterally to the locking hook, serve to secure the position of the two locking means 220.

During the plug-in process of the plug and socket device 100 in FIG. 5 the locking means 220 of the housing 200 are introduced into the recesses 330 of the base plate 300, wherein the locking arms 228 slide along on the ramp surfaces 312, 313 of the locking nose 310 and from the starting position are elastically deformed in a first plane X such that the two locking hooks 228 are moved away from each other. During the continuing plug-in process of the housing 200 and the base plate 300 the locking means 220 with the locking hooks 228 encounter in each case a first ramp surface 322 of one of the two securing elements 320 and slide along on the latter, so that the locking means 220 in each case experience an additional elastic deformation in the second plane y, which is perpendicular to the first plane x.

The two locking hooks 228 of the locking means 220 are thus on the one hand moved away from each other by the locking nose 310 and on the other hand are moved forwards and/or towards each other by the securing elements 320. At the same time, the securing elements 320 are formed by the pyramidal or triangular design such that during the plugging together of the housing 200 and the base plate 300 the locking means 220 slide along on the securing elements 320 and the locking nose 310 such that the latter offer essentially no resistance to the plug-in process.

After the locking hooks 228 have also passed through the locking noses 310, elastically deformed locking means 220 move from the pressed-apart position back into the starting position, the locking hooks 228 of the locking means 220 thereby encompass the locking surface 311 of the locking nose 310 and in each case one of the two ramp surfaces 312, 313 of the locking nose 310. Thus, the locking means 220 in the fully plugged-in position essentially spring back again into their starting position and in the plugged-in position of the plug and socket device 100 preferably have neither a deformation in the first plane x nor in the second plane y.

In principle, the locking hooks 228 extend away from the securing elements 320 in the direction of the locking nose 310, so that a secure positive locking can be established between the locking hook 228 and at least one locking nose 310. By securing the position of at least one securing element 320 this positive locking can be permanently ensured between locking nose 310 and locking hook 228.

As depicted in detail in the schematic detailed view in FIG. 6, the embodiment of the securing element 320 can be adapted to the respective embodiment of the locking nose 310, so that an isosceles triangle with a lower base side 325 and two legs 323, 324 is also conceivable, wherein the tip of the triangle points in the direction of the housing 200 and the two ramp surfaces 323, 324 of the securing element 320 thus seen from the top down go further and further apart. It can also be seen that in the fully plugged-in position the rear engagement a of the locking hook 228 behind the locking surface 311 of the locking nose 310 is greater than a lateral distance d between the securing element 320 and the locking hook 310, so that the securing element 320 in the fully plugged-in position serves to secure the position of the locking hook 228. The securing element 320 thus blocks the locking hook 228 whereby a detachment of the plug and socket device 100 is made additionally difficult. Furthermore, it can be learned from the embodiment, that the locking hooks can merely slide on the two ramp surfaces 323, 324 of the securing element 320 and thus during the plug-in process only experience an elastic deformation in the first plane x and no elastic deformation in the second plane y. This type of securing element 320 can be used in the embodiment of FIG. 4 or FIG. 5.

In principle, the housing 200 as depicted in FIGS. 1 and 3 has four locking means 220, which correspond to four locking noses 310 of the base plate 300, so that in the depicted plugged-in position in each case one securing clement 320 is arranged in the center between in each case two of the four locking hooks 228 and in each case one locking hook 228 engages behind one locking nose 310. As can be seen in FIG. 3 the base plate 300 is designed such that it can accommodate three of the housings 200, which are arranged next to each other along the plane X.

The plug and socket device 100 is suitable for establishing a permanent mechanical, electrical, and/or optical connection which is can only be detached with difficulty.

The invention is not limited to the embodiments described, but rather also comprise further embodiments having the same effect. The figure description is merely for the purpose of understanding the invention.

The invention claimed is:

1. A plug and socket device, comprising:
   at least one housing, and
   one base plate for accommodating the at least one housing;
   the housing comprises one base body and at least two locking means located thereon, the locking means in each case have one elongated locking arm and one locking hook, wherein the base plate has at least one locking nose corresponding to the locking means, and the locking nose is formed such that in a fully plugged-in position of the housing and the base plate, the locking hooks engage behind the locking nose such that a positive locking is established between the locking means and the locking nose, so that an unintentional detachment of the plug and socket device is made difficult,
   wherein the base plate in addition has at least one securing element, wherein the securing element is designed such that the securing element prevents the removal of the locking hook and thus in the fully plugged-in position serves to secure the position of the locking means, wherein the locking nose is designed such that during plugging together of the housing and the base plate the locking nose starting from a starting position causes an elastic deformation of the locking means in a first plane, so that the housing is plugged into the base plate against a resistance caused by said elastic deformation, wherein the securing element is formed such that the securing element in the fully plugged-in position prevents an elastic deformation of the locking means in the first plane, wherein the securing element is formed such that during the plugging together of the housing and the base plate the securing element causes an elastic deformation of the locking means in a second plane, which is perpendicular to the first plane, wherein the securing element starting from the base plate extends pyramidally in the direction of the housing such that during the plugging together of the housing and the base plate the locking means slide along on a side surface of the pyramidal securing element and are elastically deformed in the direction of the second plane.

2. A plug and socket device according to claim 1, wherein the securing element is formed such that during plugging together of the housing and the base plate the locking means slide along on the securing element, that the securing element offers essentially no resistance to the plugging together.

3. A plug and socket device according to claim 1, wherein the locking nose and the locking means are formed such that the locking means in the fully plugged-in position essentially spring back again into their starting position and have no deformation in the first plane.

4. A plug and socket device according to claim 1, wherein the locking means in the fully plugged-in position have no deformation in the second plane.

5. A plug and socket device according to claim 1, wherein a rear engagement (a) of the locking hooks behind the locking nose is greater than a lateral distance (d) between the securing element and the locking hook.

6. A plug and socket device according to claim 1, wherein the locking means have a material composition, which is selected such that in the case of effects of a sufficiently high tractive force the plug connection is detached by a plastic deformation of the locking means.

7. A plug and socket device according to claim 1, wherein the base plate, the securing element, and the locking nose have a material composition, which is selected such that the base plate, the securing element, and the locking nose remain essentially intact when the plug and socket device is detached.

8. A plug and socket device according to claim 1, wherein the securing element in the fully plugged-in position is arranged between two locking means of the housing, wherein in each case a locking hook engages behind a locking nose.

9. A plug and socket device according to claim 8, wherein the base plate has at least four locking noses, which correspond to four locking means of a housing, wherein in the fully plugged-in position in each case at least one securing element is arranged between in each case two of the four locking means and in each case one locking hook engages behind a locking nose.

10. A plug and socket device according to claim 1, wherein the locking nose in the fully plugged-in position is arranged between two locking means of a housing, wherein the two locking hooks are oriented such that they engage behind the same locking nose.

11. A plug and socket device for the secured transmission of electrical or optical signals and power outputs according to claim 1.

* * * * *